UNITED STATES PATENT OFFICE.

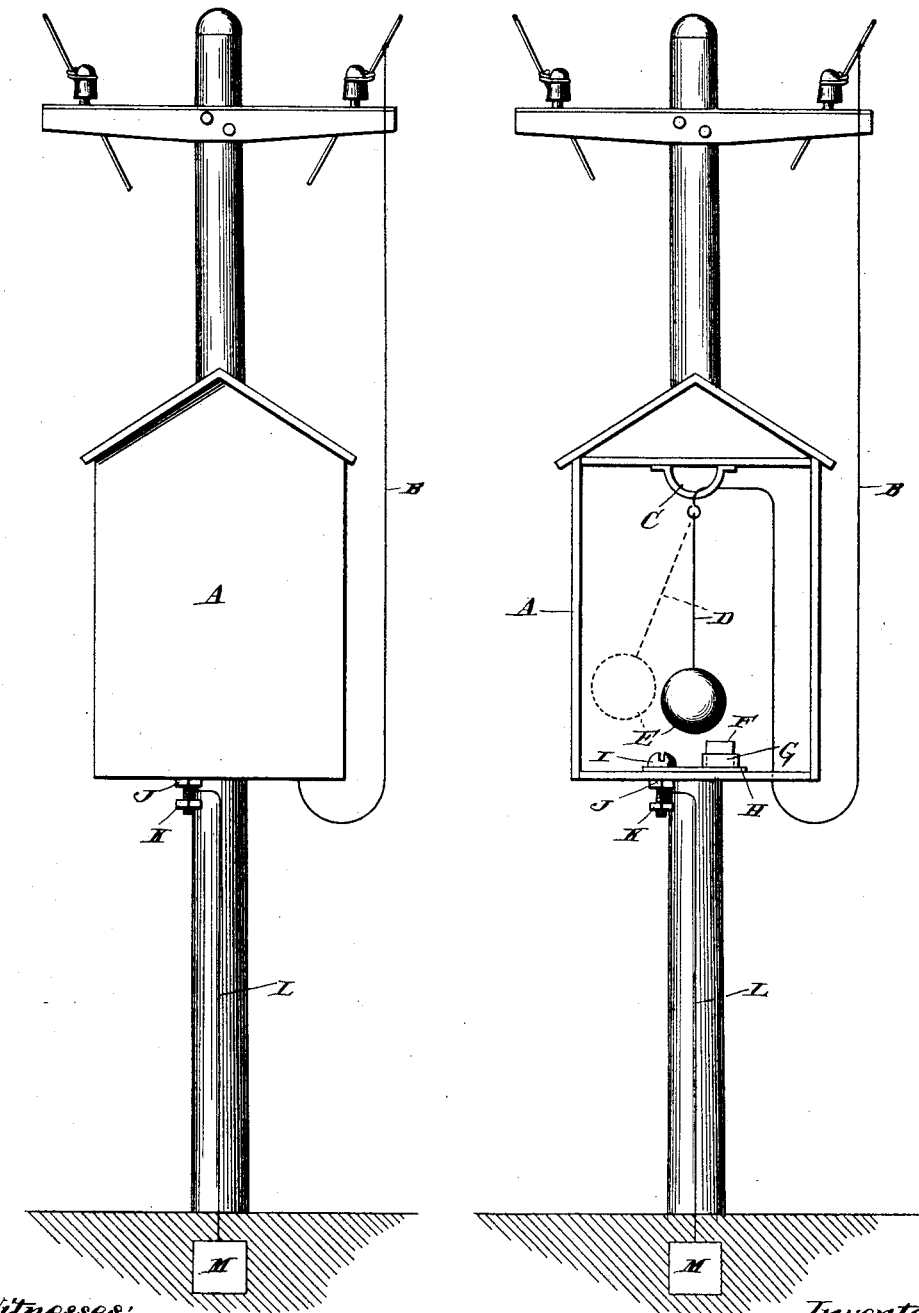

JAMES E. BROWNE AND FREDERICK H. TIDNAM, OF ELIZABETH, NEW JERSEY, ASSIGNORS TO JAMES E. BROWNE, OF SAME PLACE.

LIGHTNING-ARRESTER.

SPECIFICATION forming part of Letters Patent No. 475,482, dated May 24, 1892.

Application filed July 10, 1889. Serial No. 317,096. (No model.)

*To all whom it may concern:*

Be it known that we, JAMES E. BROWNE and FREDERICK H. TIDNAM, citizens of the United States, residing at Elizabeth, county of Union, and State of New Jersey, have invented certain new and useful Improvements in Lightning-Arresters for Electric-Light or other Electric Circuits; and we hereby declare the following to be a full, clear, and exact description of the invention, such as will enable others skilled in the art to which it appertains to make and use the same.

Our invention relates to improvements in lightning-arresters in which an air-space is left between the line and ground connections of the lightning-arrester.

Heretofore lightning-arresters have frequently grounded the line-circuits to which they have been attached. This is usually caused by the line-current following a lightning discharge and forming an arc between the line and ground connections, thereby fusing the line and ground connections together, thus grounding the main line.

Various forms of lightning-arresters provided with arc and ground circuit breaking devices operated by electro-magnets and controlled by the main-line current have been used to prevent grounding the circuits by lightning-arresters; but the electro-magnets of such arresters are liable to destruction by the lightning discharge before the devices can operate, in which case such lightning-arresters will fail of their purpose and become a source of danger.

The object of our invention is to provide a cheap, simple, and safe lightning-arrester operated by the lightning's discharge and which will prevent fusing or grounding of the circuit without the intervention of electro-magnets and armatures operated by the line-currents. We attain this object by the mechanism illustrated in the accompanying drawings.

Figure 1 is a view of a lightning-arrester, represented in this case as attached to an electric-light pole in order to show the manner of operating more clearly. Fig. 2 is a view of the arrester with the front part of the box removed, showing the working parts within.

Similar letters of reference refer to like parts throughout the different views.

A represents the box or envelope, of waterproof insulating or suitable material, containing the working parts of the lightning-arrester.

B represents a wire, preferably covered with water-proof insulating material, connected electrically at its upper end in any well-known manner to the main line, and passing downward to arrester-box A.

Hereinafter we shall designate wire B as "line connection B." Line connection B should preferably pass upward through the bottom of box A to prevent in rainy weather what is known as "wet grounds." Line connection B should then be carried upward and fastened to a suitable support C on the inner side of box A. Line connection B is then passed downward through support C, where it terminates in an eye or loop, as shown.

D represents a wire or rod of metal, the upper end of which is passed through the eye or loop in the termination of wire B and looped within it. Thus it will be seen that wire B and rod D will then be linked together, forming a universal-jointed device, so as to permit rod D to swing freely in any direction. The lower end of rod D is firmly fastened to a ball or pendant E, of metal or other suitable material. Ball E should be as light as possible. We do not confine ourselves to any particular shape of pendant, but prefer a hollow ball. Beneath the pendant E, but separated from it by a space, is a grounding device F of suitable conducting material and fitted into an adjustable socket or holder G.

H is a plate of metal, one end of which is fastened to or it may form a part of the side or bottom of socket G. Through the other end of plate H a hole is bored, through which the screw I is passed. Screw I passes downward through the bottom of box A, through which it projects. It is held firmly in place by a threaded nut J, thus forming an axis or pivot around which plate H and socket G may be moved, carrying with it socket G and grounding device F, to which it is attached. The position between pendant E and grounding device F may be changed by moving plate H horizontally upon its pivot I in the required direction. It will therefore be seen that any necessary adjustment of the working parts may thus be easily made. The lower part of screw I should project far enough through the box or envelope A to pass through a second threaded nut K, which is placed upon it.

L is a wire with its upper end connected electrically to the protruding end of screw I and firmly held in place between the nuts J and K, as shown; or any suitable fastening device may be employed to keep the upper end of wire L in electrical connection with the apparatus, as shown. The lower end of wire L is electrically connected with the buried ground plate M, or any other means of obtaining what is technically called a "ground." We shall hereinafter designate wire L as the "ground-connection wire." It will be obvious that lightning in passing from the main line to ground through the wire B, swinging rod D, to ball or pendant E, grounding device F, socket G, screw I, and ground-connection wire L must leap across the space between pendant E and grounding device F, and that the shock or explosion accompanying the flash or spark will drive the pendant E away from grounding device F, as shown in the dotted lines, Fig. 2, thereby preventing the main-line current from forming an arc, while the swinging motion, which will be maintained for some time by the pendant E after the first impulse has passed away, will prevent soldering or fusing together of the parts from any cause. When the arrester is placed upon poles, a swinging motion is maintained by vibration independently of the lightning's impulse.

We do not confine ourselves to any particular method of connecting the arrester or of adjusting the same. It is plain that the grounding device F might be fixed immovably in the box A and different lengths of swinging rods D be connected to the ball or pendant E to suit each case, or that the rod D may be used as a pendant and the ball E may be omitted; also, that a series of links or a chain be used in place of rod D; but, Having described our invention, what we claim, and desire to secure by Letters Patent, is—

1. In a lightning-arrester, a swinging ball or pendant suspended by a universally-jointed rod or device and divided by a space from a grounding device, for the purpose and operating substantially as described.

2. In a lightning-arrester, the combination of the box or envelope A, the main-line connection B, the support C, the looped or linked rod D, the ball or pendant E, suspended over a grounding device F by means of said rod D, and operating substantially as described.

3. In a lightning-arrester, the universally-jointed rod D, suspending the pendant E, (said pendant E being capable of moving in any direction,) in combination with the grounding device F, said grounding device F being electrically connected by suitable means with ground-wire L, for the purpose and operating substantially as described.

4. In a lightning-arrester, the combination, with an electrical circuit, of the box or envelope A, main-line connection B, the support C, and the pendant E, suspended over grounding device F, said grounding device F being electrically connected with ground-wire L, substantially as described.

JAMES E. BROWNE.
FREDK. H. TIDNAM.

Witnesses:
C. ADDISON SWIFT,
JOHN MURRY.